United States Patent [19]

Nishimura et al.

[11] Patent Number: 4,713,685

[45] Date of Patent: Dec. 15, 1987

[54] VIDEO MONITORING APPARATUS

[75] Inventors: Shigeru Nishimura, Machida; Toshihisa Kuroda, Sagamihara, both of Japan

[73] Assignee: Matsushita Electric Industrial Co., Ltd., Kadoma, Japan

[21] Appl. No.: 784,021

[22] Filed: Oct. 4, 1985

[30] Foreign Application Priority Data

| Oct. 5, 1984 [JP] | Japan | 59-209104 |
| Nov. 9, 1984 [JP] | Japan | 59-236135 |
| Dec. 14, 1984 [JP] | Japan | 59-263861 |
| Apr. 18, 1985 [JP] | Japan | 60-82827 |
| Jun. 19, 1985 [JP] | Japan | 60-133231 |

[51] Int. Cl.$^4$ .......................... H04N 7/00; H04N 7/01
[52] U.S. Cl. ................................... 358/103; 358/108; 358/140; 358/133

[58] Field of Search ............... 358/87, 103, 108, 133, 358/138, 140, 11, 183, 22, 136

[56] References Cited

FOREIGN PATENT DOCUMENTS 934037 8/1963 United Kingdom ............... 358/103

*Primary Examiner*—James J. Groody
*Assistant Examiner*—Michael D. Parker
*Attorney, Agent, or Firm*—Cushman, Darby & Cushman

[57] ABSTRACT

A video signal which is provided up by a conventional video camera is converted into a digital signal, and a necessary part of the digital signal is selected, is memorized and is displayed, and furthermore, two video images are picked up by two video cameras are connected in the shape of video signal side by side, and if necessary, disposition of one or both of the two video images are reversed in the horizontal direction.

7 Claims, 17 Drawing Figures

3:4

3:8

3:8

3:4

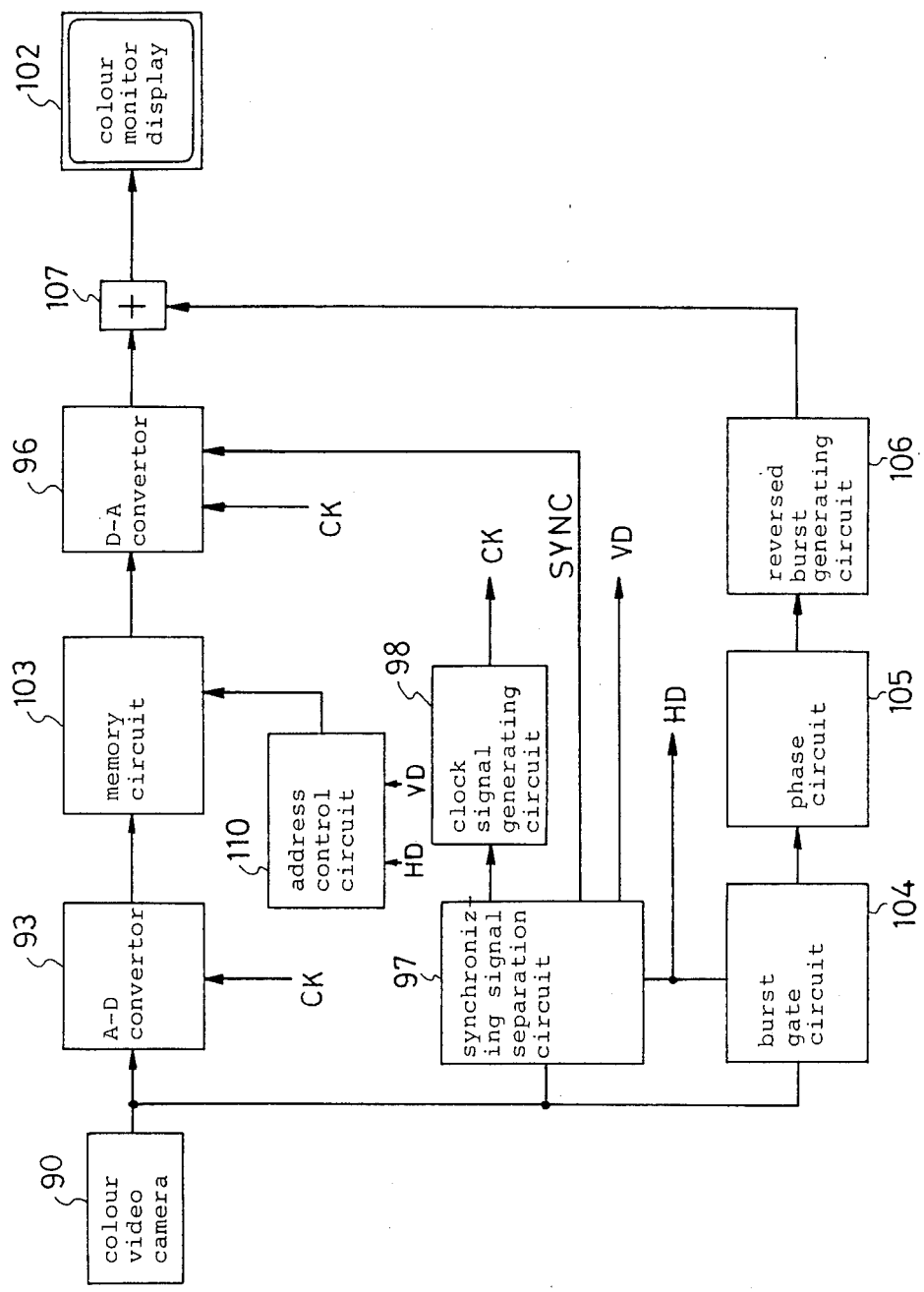

VIDEO MONITORING APPARATUS

FIELD OF THE INVENTION AND RELATED ART STATEMENT

1. Field of the Invention

The present invention relates generally to a video monitoring apparatus and especially concerns a video monitoring apparatus for monitoring a rear area of a vehicle such as a bus, for example, by a video system wherein the display unit is arranged in a dash-board and the video camera is arranged on a rear part of the vehicle.

2. Description of the Related Art

In a conventional video monitoring system, a video camera for a vehicle is fixed on a rear part of a large-sized bus or the like. When the vehicle goes backward, a backward scene is observed by the video camera and is displayed on a video monitor display wherein an aspect ratio is 3 to 4. The driver of the bus can watch the rear area of the bus through the video monitor display.

Recently, the video camera for monitoring has been miniaturized and become lighter in weight by improvement of a sensor element. Furthermore, an ability to resist vibration and its service life are improved, and a video monitoring system using plural video cameras is planned.

Nevertheless, in the above-mentioned display with the aspect ratio of 3 to 4, an unnecessary scene of the sky occupies a large area of the display, and the confirmation of an object in the rear of the vehicle by the driver is not easy.

Where plural cameras are used in the conventional system, a scene which is picked up by only one of the plural cameras is displayed on the monitor display. Therefore, in such a case, the driver cannot watch plural scenes from the plural video cameras simultaneously.

In order to minimize the above-mentioned defect, a mutli display method is proposed. In one of these multi display methods, the images which are picked up by the plural video cameras are displayed simultanously on one cathode ray tube. In this method, the electron beam deflection speed of the video cameras is increased to be two times that of the conventional camera, therefore the image from the one video camera is displayed on the upper half part of the cathode ray tube, and the image from the other video camera is displayed on the lower half part of the cathode ray tube.

On the other hand, in another method, a conventional video camera is used, and video signals from the two video cameras are memorized by frame memories. The memorized video signals are displayed on one cathode ray tube in turn.

However, in the above-mentioned former method, the electron beam deflection circuit must be considerably changed to increase the deflection speed by twice that of the video camera. Therefore the video camera therefor has a special design. The degree of freedom of an arrangement of the video system is restricted, and there is a problem as to interchangeability of the video camera.

On the other hand, in the above-mentioned latter method, there is a disadvantage that an expensive device such as frame memory is necessary.

OBJECTS AND SUMMARY OF THE INVENTION

An object of the present invention is to realize a video monitoring apparatus which has a horizontally wide visual field allowing easy observation of the other vehicles when the vehicle makes a backward movement.

The other object of the present invention is to realize a video monitoring apparatus wherein a vertical visual field may be made wide when the vehicle turns to the right or the left.

A further object of the present invention is to realize a video monitoring apparatus wherein a standard video camera is used, and the frame memory or the like is not used. Therefore, the arrangement of the video system is free and the cost is not expensive.

Another object of the present invention is to realize a video monitoring apparatus wherein the vertical inclination of density is smooth in the image of the display after the conversion of the visual field, to improve the vertical resolution.

Another object of the present invention is to realize a video monitoring apparatus wherein the plural cameras are disposed on the left side and right side of the vehicle body and the cameras are trained rearwardly of the vehicle. The images from the plural cameras are displayed on both sides of a display which is divided by an imaginal vertical center line.

A further object of the present invention is to display an image which is picked up by a solid state image device and to reverse left and right of the image by a simple circuit.

In accordance with these objects, and others, the present invention provides a video monitoring apparatus comprising:

a video camera, an analog-digital convertor for converting analog signal consisting of n-scanning lines to digital signal, memory means for memorizing a part of the digital signal abridged from digital signals corresponding to n-scanning lines, picture range conversion means for converting picture range by reading out data from the memory means, to reconstitute a picture signal consisting of n-scanning lines, and display means for displaying video pictures produced by the picture angle conversion means.

BRIEF DESCRIPTION OF THE DRAWINGS

FIG. 10 is a circuit diagram of a fifth embodiment of the video monitoring apparatus in the present invention.

DESCRIPTION OF THE PREFERRED EMBODIMENTS

Figure 1:
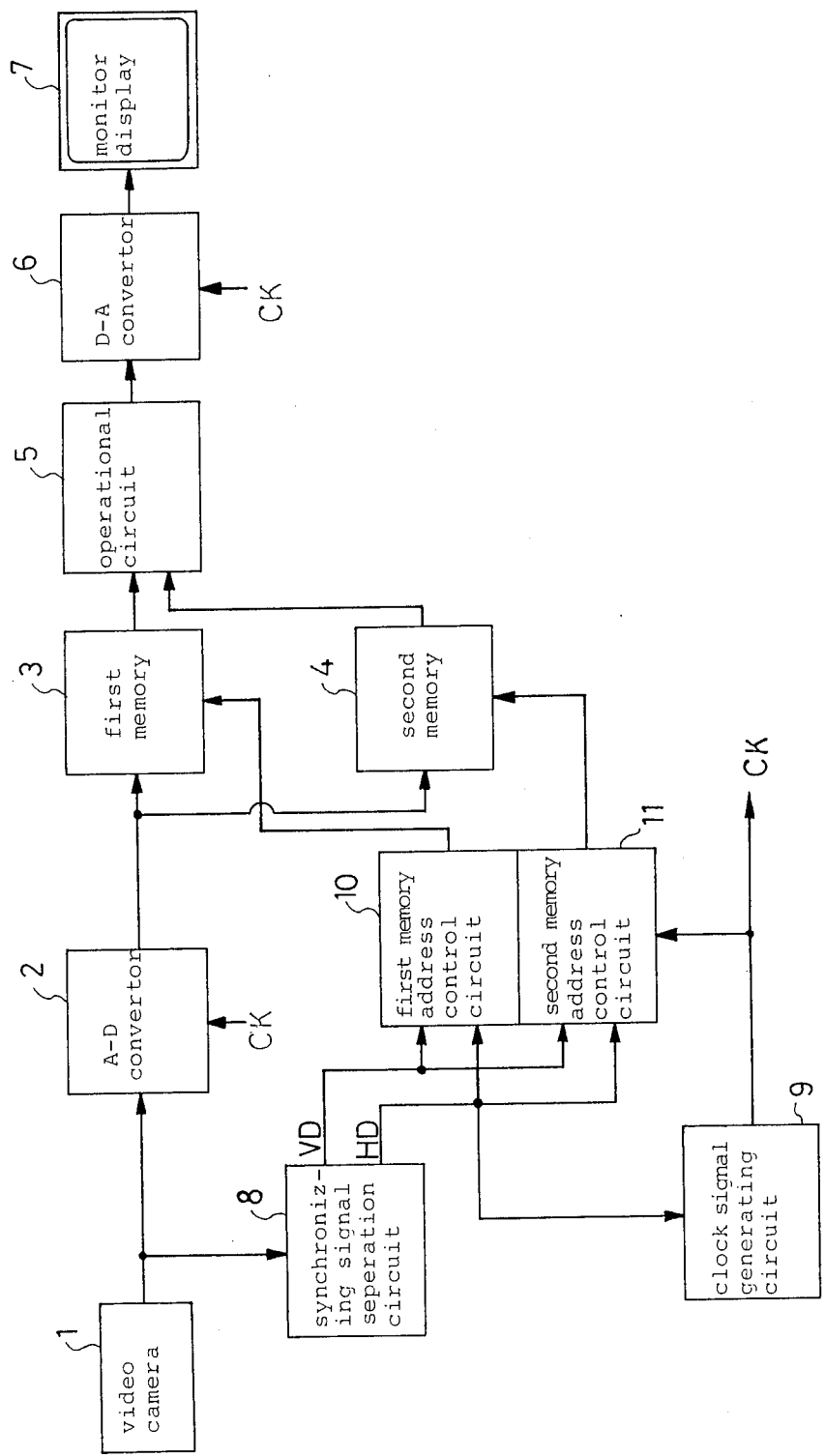
FIG. 1 is a circuit diagram of a first embodiment of a video monitoring apparatus in the present invention.

A first embodiment of a video monitoring apparatus for observing the rear part of a vehicle is shown in FIG. 1.

In FIG. 1, a video camera 1 has a visual field having an aspect ratio of 3 to 4. An analog digital convertor 2 (hereafter referred to as A-D converter 2) converts analog signal from the video camera 1 to digital signal. A first memory 3 memorizes the video signals of the fields of the odd numbers, and a second memory 4 memorizes the video signals of the fields of the even numbers. An operational circuit 5 is a circuit for generating signal of scanning lines which is inserted between two scanning lines of the above-mentioned first memory 3 and second memory 4. A digital-analog convertor 6 (hereafter referred to as D-A convertor 6) convertes the digital signal from the operational circuit 5 to analog signal. A monitor display 7 makes display with a aspect ratio of 3 to 4. A synchronizing signal separation circuit 8 separates the vertical and horizontal synchronizing signals from the output signals of the video camera 1. A clock signal generation circuit 9 generates clock signals. A first memory address control circuit 10 and a second memory address control circuit 11 control the first emmory 3 and the second memory 4, respectively.

The operation of the first embodiment is as follows. The video signal which is issued by the video camera 1 has the display signal of the aspect ratio of 3 to 4, and has the 525 scanning lines. This video signal is converted to the eight bit digital signal by the A-D convertor 2. The video signal is also applied to the synchronizing signal separation circuit 8, and the vertical synchronizing signals VD and the horizontal synchronizing signal HD of the video signal are separated thereby. The horizontal synchronizing signal HD is applied to the clock signal generating circuit 9 for driving the scanning lines. The clock signal from the clock signal generation circuit 9 is also applied to the first memory address control circuit 10 and the second memory address control circuit 11, the A-D convertor 2, and the D-A convertor 6. Furthermore, the output signals of the synchronizing signal separation circuit 8 are applied to the first memory address control circuit 10 and the second memory address control circuit 11, and therefrom address control signals for the first memory 3 and the second memory 4 are issued. When the first memory address control circuit 10 and the second memory address control circuit 11 receive the vertical synchronizing signal, both circuits start to count the horizontal synchronizing signals, and when both circuits finish counting of, for example, the signals of one fourth of all horizontal synchronizing signals of one field, a gate pulse is issued by the first memory address control circuit 10 and second memory address control circuit 11. The gate pulse is applied to the first memory 3 and the second memory 4, and the first memory 3 and second memory 4 start to memorize the digital data from the A-D converter 2. When the first memory 3 and second memory 4 finish memorization of the data of, for example, one-half of all horizontal synchronizing signals of one field, the gate pulse disappears, and the data for the rest of the field, namely, the last one fourth of one field, is not memorized. As a result, the video signals corresponding to the central half part of the visual field picked up by the video camera 1 are memorized, and number of memorized scanning lines are 262. As a result of abridged memorization of the central half part, in case of the actual visual scene, an upper part such as sky and a lower part such as ground are eliminated. In the data from the A-D convertor, the data corresponding to the first field is memorized by the first memory 3 as shown by oblique lines in FIG. 2(b), and the data corresponding to the second field is memorized by the second memory 4 as shown by oblique dotted lines in FIG. 2(b).

The data memorized in the first memory 3 are read out while the memory 4 memories the data, and is applied to the operational circuit 5. On the contrary, the data memorized in the second memory 4 are read out while the memory 3 memorizes the data.

The operational circuit 5 calculates average values between the data of the first memory 3 and the second memory 4, and generates a new scanning line and inserts it between the two scanning lines based on the data of the first memory 3 and second memory 4.

The output signals of the operational circuit 5 are converted to analog signals by the D-A convertor 6, and is applied to the monitor display 7. In the monitor display 7, the aspect ratio becomes 3 to 8, because, as mentioned above, the upper part and the lower part of the visual field of the ratio 3 to 4 of the conventional video camera are eliminated.

Figure 3A:
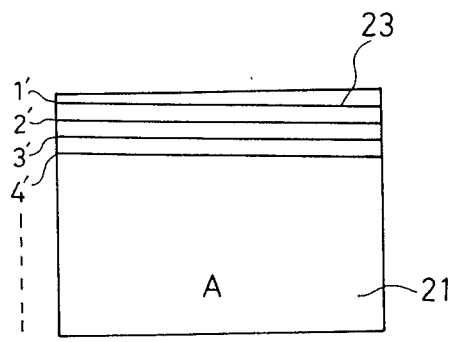
FIG. 3(a), FIG. 3(b) and FIG. 3(c) are schematic views showing an example of displaying in the second embodiment of the present invention.
Figure 3B:
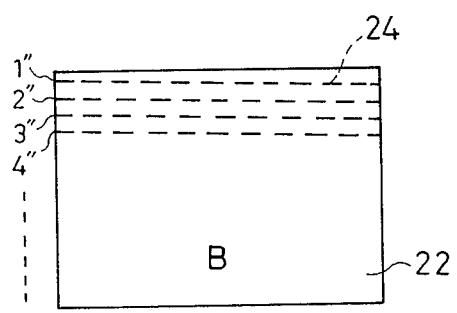
Figure 3C:
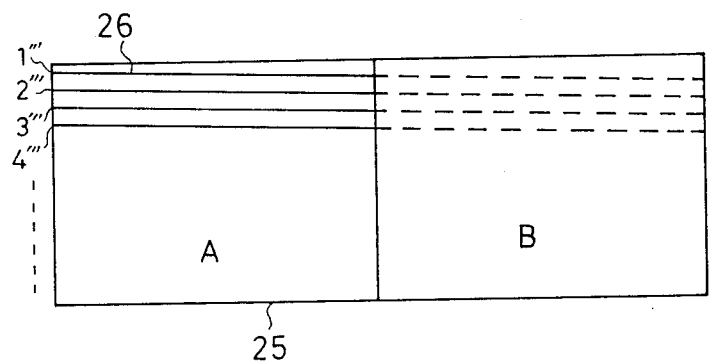
Figure 4:
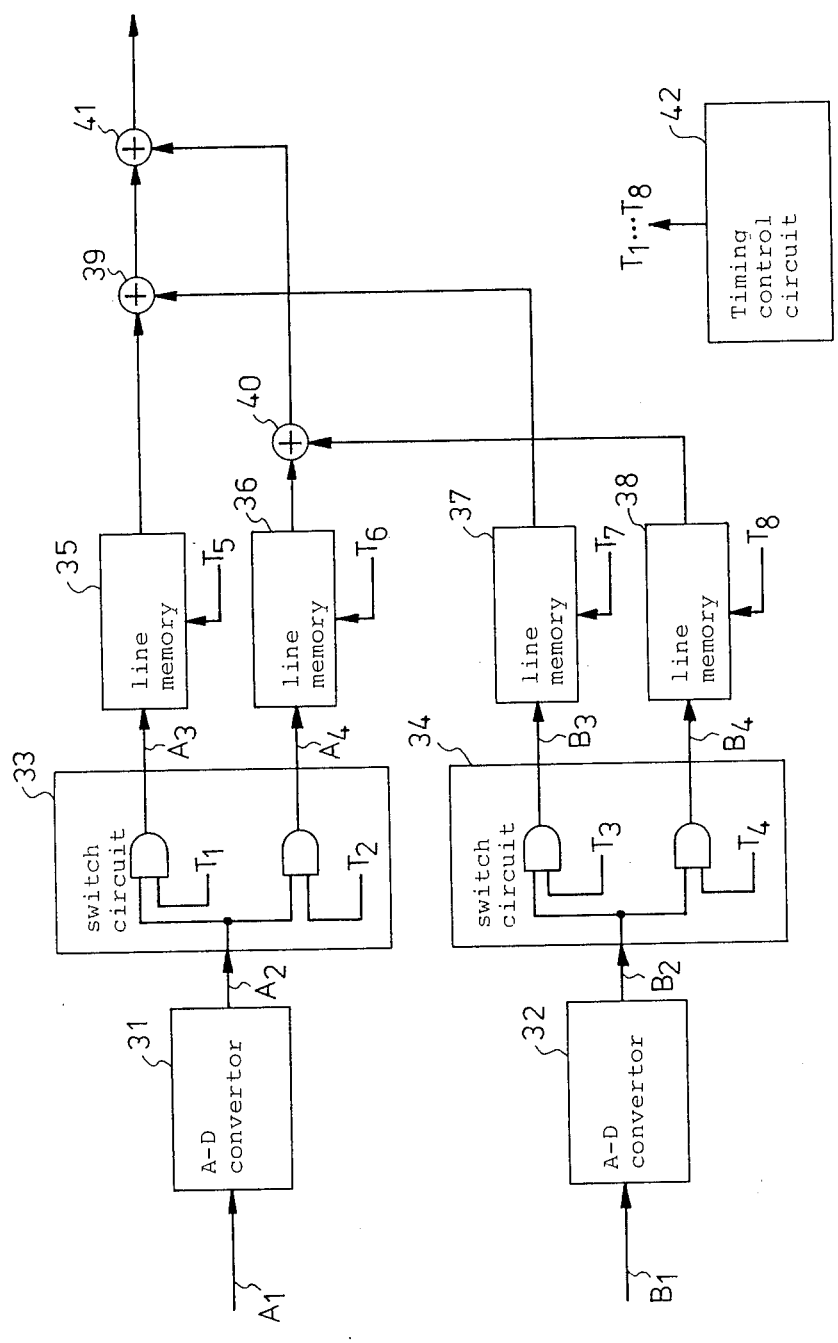
FIG. 4 is a circuit diagram for displaying the compounded image.

A second embodiment as to a compound display method of the images is shown in FIG. 3 and FIG. 4. In FIG. 3, a display 21 is made with a signal picked up by a first video camera A1, and a display 22 is made with a signal picked up by a second video camera B1, as shown in FIG. 4. The first video camera A1 is disposed, for example, on the left side of the vehicle, and the second video camera B1 is disposed on the right side of it. The video cameras A1 and B1 picked up the scene of the left and the right of the vehicle, respectively. The scanning lines 23 (FIG. 3a) display an image from the first video camera A1, and respective scanning lines are assigned numbers as 1', 2', 3' . . . . The scanning lines 24 (FIG. 3b) display the image from the second video camera B1, and respective scanning lines are assigned numbers as 1'', 2'', 3'' . . . . Respective scanning line 24 of the display 22 is connected to respective scanning line 23 of the display 21. For example, the scanning line 1'' is connected to the scanning line 1', and thereby constitutes a newly formed scanning line 1. As a result, the display 21 and the display 22 are combined side to side as shown in FIG. 3(c). As mentioned above, a new display 25 which has the aspect ratio of 3 to 8 is formed on one cathode ray tube.

The circuit diagram for the above-mentioned image processing is shown in FIG. 4. The video signal from the first video camera A1 is applied to the A-D converter 31, and the video signal from the second video camera B1 is applied to the A-D convertor 32. Each A-D convertor converts the video signal to 8 bit digital signal. A switch circuit 33 is controlld by control signals $T_1$, $T_2$ from a timing control circuit 42, and switches the output signal A2 of the A-D converter 31. A switch circuit 34 is also controlled by control signals $T_3$, $T_4$ from the timing control circuit 42, and switches the output signal B2 of the A-D convertor 32. These control signals $T_1$, $T_2$, $T_3$, and $T_4$ synchronize to the horizontal synchronizing signal, and switch the switch circuits 33, 34 in every scanning line. As a result, the digital data of the odd numbered scanning lines corresponding to the first video camera A are issued to an output A3 and the digital data of the even numbered scanning lines are issued to an output A4 by turns. Likewise, the digital data of the odd numbered scanning lines corresponding to the second video camera B are issued to an output B3 and the digital data of the even numbered scanning lines are issued to an output B4 by turns.

Line memories 35, 36 are controlled by the control signal $T_5$, $T_6$ issued from the timing control circuit 42, and memorize the data from the outputs A3, A4, respectively. Likewise, line memories 37, 38 are controlled by the control signal $T_7$, $T_8$ issued by the timing control circuit 42, and memorize the data from the outputs B3, B4, respectively. These line memories 35, 36, 37 and 38 issue the memorized data with twice speed comparison with the memory speed by the control signal $T_5$, $T_6$, $T_7$ and $T_8$ of the timing control circuit 42, respectively.

An odd numbered scanning line adder 39 controls the issue of the data from the line memories 35, 37, and after the output data of the line memory 35 are issued, the output data of the line memory 37 are issued. Likewise, an adder 40 controls the issue of the data from the line memories 36, 38, and after the output data of the line memory 36 are issued, the output data of the line memory 38 are issued. An adder 41 controls the issue of the data from the adders 39 and 40, and after the output data of the adder 39 is issued, the output data of the adder 40 is issued. The output data of the adder 41 is converted to an analog signal by a D-A converter (not shown in FIG. 4), and is applied to the display 25 in FIG. 3.

As a result the odd numbered scanning line 1", 3", . . . of the video camera B1 are connected to the odd corresponding numbered scanning line 1', 3', . . . of the video camera A1, and the even numbered scanning line 2", 4" . . . of the video camera B1 are connected to the corresponding even numbered scanning lines 2', 4', . . . of the video camera A1, respectively. Furthermore, the connected odd numbered scanning lines 1''', 3''', . . . and the connected even numbered scanning lines 2''', 4''', . . . are displayed on the display 25 by turns as shown in FIG. 3(c). Therefore, the display 25 has the aspect ratio of 3 to 8. In this embodiment, the scanning line is scanned with 15.75 KHz, and a clock frequency for reading out is twice the clock frequency for memory.

In this embodiment, the field memory for memorizing two fields is unnecessary. A multi display is realized by using the four line memories 35, 36, 37, and 38 only. Furthermore, since the synchronizing method of the video signal is conventional and the video camera with the aspect ratio of 3 to 4 of the visual field is used, the monitoring apparatus of this embodiment is economical.

Figure 5:
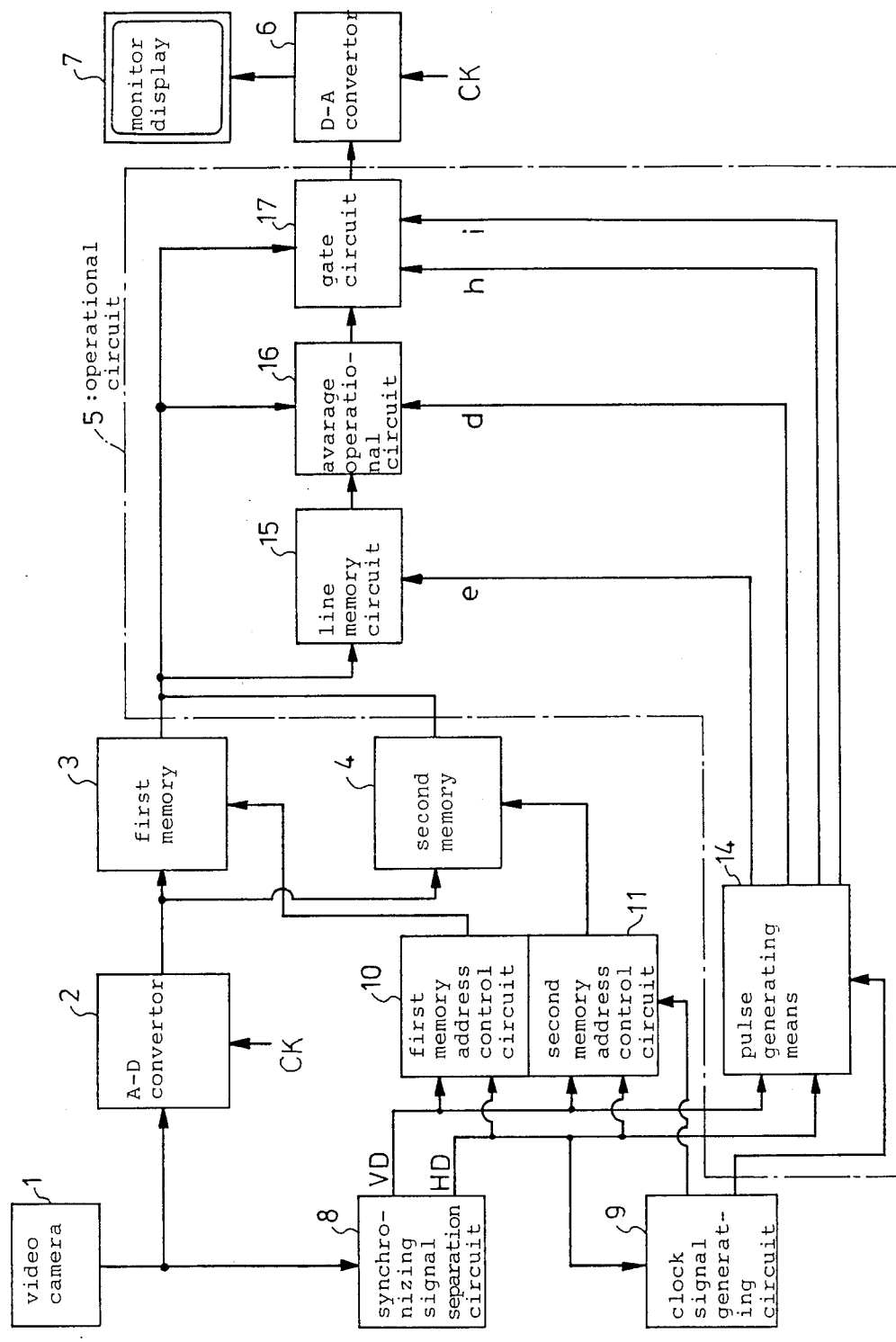
FIG. 5 is a detailed circuit diagram of an operational circuit of the first embodiment of a video monitoring apparatus in the present invention.

Detail of the operational circuit 5 of FIG. 1 is shown in FIG. 5. In FIG. 5, the portion of the circuit diagram surrounded by a dotted line is the operational circuit 5, and the remaining circuitry is the same as the circuit diagram shown in FIG. 1.

In FIG. 5, a pulse generating means 14 for operational control is operated by the clock signal from the clock signal generating circuit 9, the vertical synchronizing signal VD and the horizontal synchronizing signal HD from the synchronizing signal separation circuit 8. Furthermore, the pulse generating means 14 issues control signals for writing the line memory circuit 15 as shown in FIG. 6(e), the operational control pulse for controlling the average operational circuit 16 as shown in FIG. 6(d), the gate pulse for controlling the gate circuit 17 as shown in FIG. 6(h) and the gate pulse for controlling the gate circuit 17 as shown in FIG. 6(i). A line memory circuit 15 memorizes the data of the scanning line which is memorized in the first memory 3 or the second memory 4. An average operational circuit 16 calculates the average value of the data which is read out from the first memory 3 and the second memory 4 and the data which is read out from the line memory 15. The output data from the average operational circuit 16 is applied to a gate circuit 17.

Figure 6:
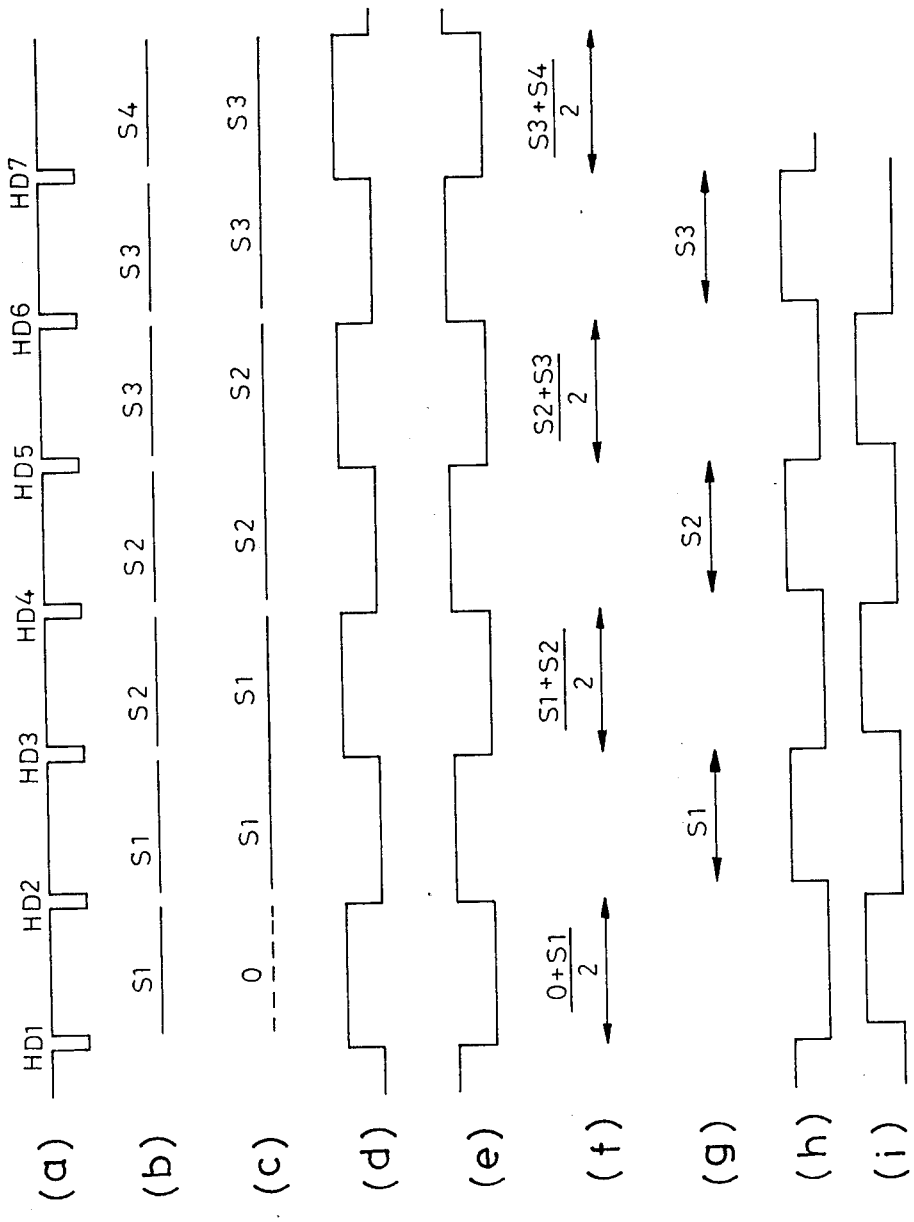
FIG. 6 is a timing chart showing the operation of the second embodiment in the present invention.

The operation of the operational circuit 5 is shown in FIG. 6. The data corresponding to the first field as shown by the lines in FIG. 2(a) is memorized by the first memory 3, and in the next stage, the data corresponding to the second field as shown by the dotted line in FIG. 2(a) is memorized by the second memory 4 as mentioned in the operation of the first embodiment as shown in FIG. 1. The memorized data of the first field is read out when the data of the second field is memorized in synchronizm with the horizontal synchronizing signal HD as shown in FIG. 6(a). In this read out operation, the same scanning line is read out twice in succession as shown in FIG. 6(b). The data of the scanning line S1 is read out by a first horizontal synchronizing signal HD1 from the first memory 3. The readout data of the scanning line S1 is applied to the average operational circuit 16 in synchronizm with the operational control pulse from the pulse generating means 14, as shown in FIG. 6(d), and the data of the line memory circuit 15 is read out and applied to the average operational circuit 16. Incidentally, in the initial state, no data is memorized in the line memory circuit 15, and zero data is read out. The average operational circuit 16 calculates the average value of the data of the line memory circuit 15 and the data of the scanning line S1, as shown in FIG. 6(f). The calculated average value is applied to the gate circuit 17. In the next stage, the data of the scanning line S1 is again read out from the first memory 3 synchronizing the second horizontal synchronizing signal HD2, and is memorized in the line memory circuit 15 in synchronizm with write control pulse as shown in FIG. 6(e), and furthermore is issued to the D-A convertor 6 through the gate circuit 17 simultaneously. The D-A convertor 6 issues the analog video signal to the video display 7. The data of the scanning line S2 is consecutively read out from the first memory 3 synchronizing the third horizontal synchronizing signal HD3.

The average value of the data of the scanning line S1 which is read out from the line memory circuit 15 and the data of the scanning line S2 is calculated, and is applied to the gate circuit 17. The gate circuit 17 controls the timing of the scanning lines from the first memory 3 and the second memory 4 and the timing of the scanning line from the average operational circuit 16, and inserts the scanning line from the average operational circuit 16 between the two scanning line from the first memory 3 and the second memory 4. The output data from the gate circuit 17 is converted to analog video signal by the D-A convertor 6 and is displayed by the video display 7.

Figure 2C:
FIG. 2(a), FIG. 2(b) and FIG. 2(c) are schematic views showing an example of displaying in the first embodiment of the present invention.
Figure 2B:
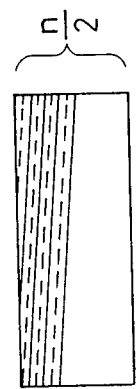
Figure 2A:
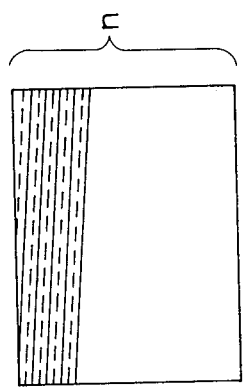

As a result, the obtained video display shown in FIG. 2(c) is formed by the 525 scanning lines. Furthermore, the obtained video display has the aspect ratio of 3 to 8, and since the vertical size of the display is one-half of the conventional video display of the 3 to 4 ratio, the clearness of the display is improved.

Figure 7:
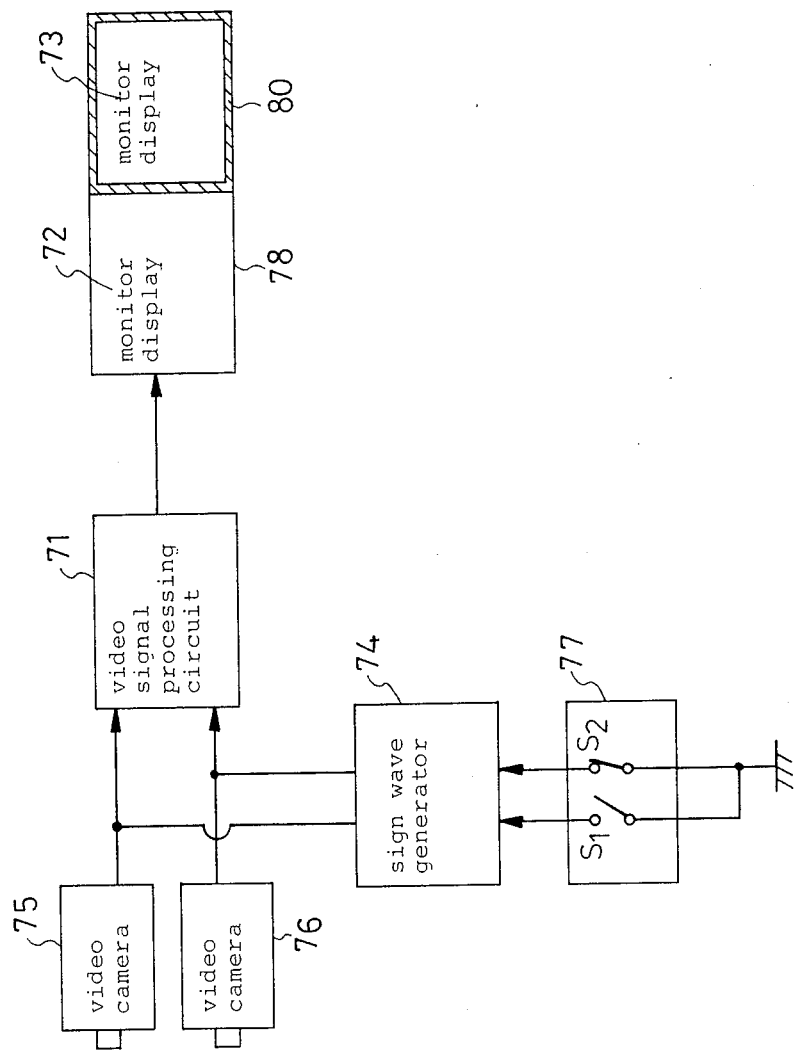
FIG. 7 is a circuit diagram of a third embodiment of a video monitoring apparatus in the present invention.

The third embodiment of the video monitoring apparatus in the present invention is shown in FIG. 7. In this embodiment, when the vehicle turns to the left or the right, the flashing signal is displayed in the video display.

In FIG. 7, a video camera 75 and 76 are disposed on both sides of the vehicle body, trained rearwardly of the vehicle. The video signals from the video cameras 75, 76 are applied to a video signal processing circuit 71. A video display 78 which is disposed on the dashboard of the vehicle is formed by a display 72 and a display 73, and the display 72 displays the video signal from the video camera 75 and the display 73 displays the video signal from the video camera 76. The video display 78 has the aspect ratio of 3 to 8. The function of the video signal processing circuit 71 is the same as the second embodiment as shown in FIG. 3 and FIG. 4. A switch 77 is operated when the turn signal of the vehicle is operated. A sign generator 74 is controlled by the switch 77 and issues a signal for displaying the flashing sign on the video display 78. When the turn signal for the right turn, for example, is operated, a contact S2 of the switch 77 is closed. The sign generator 74 issues a signal for displaying the flashing sign, on the frame part 80 of the display 73. A continuous sign can be used instead of the flashing sign. The shape of the sign can be formed as an arrow, for example (not shown in drawing).

In this embodiment, since the turn signal is displayed on the video display, the signal calls the driver's attention to the important object of the video display, and is very effective to prevent an inadvertent omission of the lighting of the turn signal.

Figure 8:
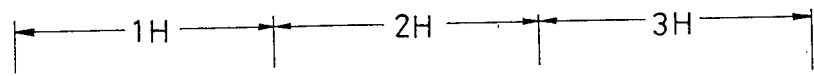
FIGS. 8A–8D show a process of reversal of scanning.
Figure 8:
Figure 8:
Figure 8:
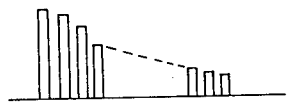
Figure 9:
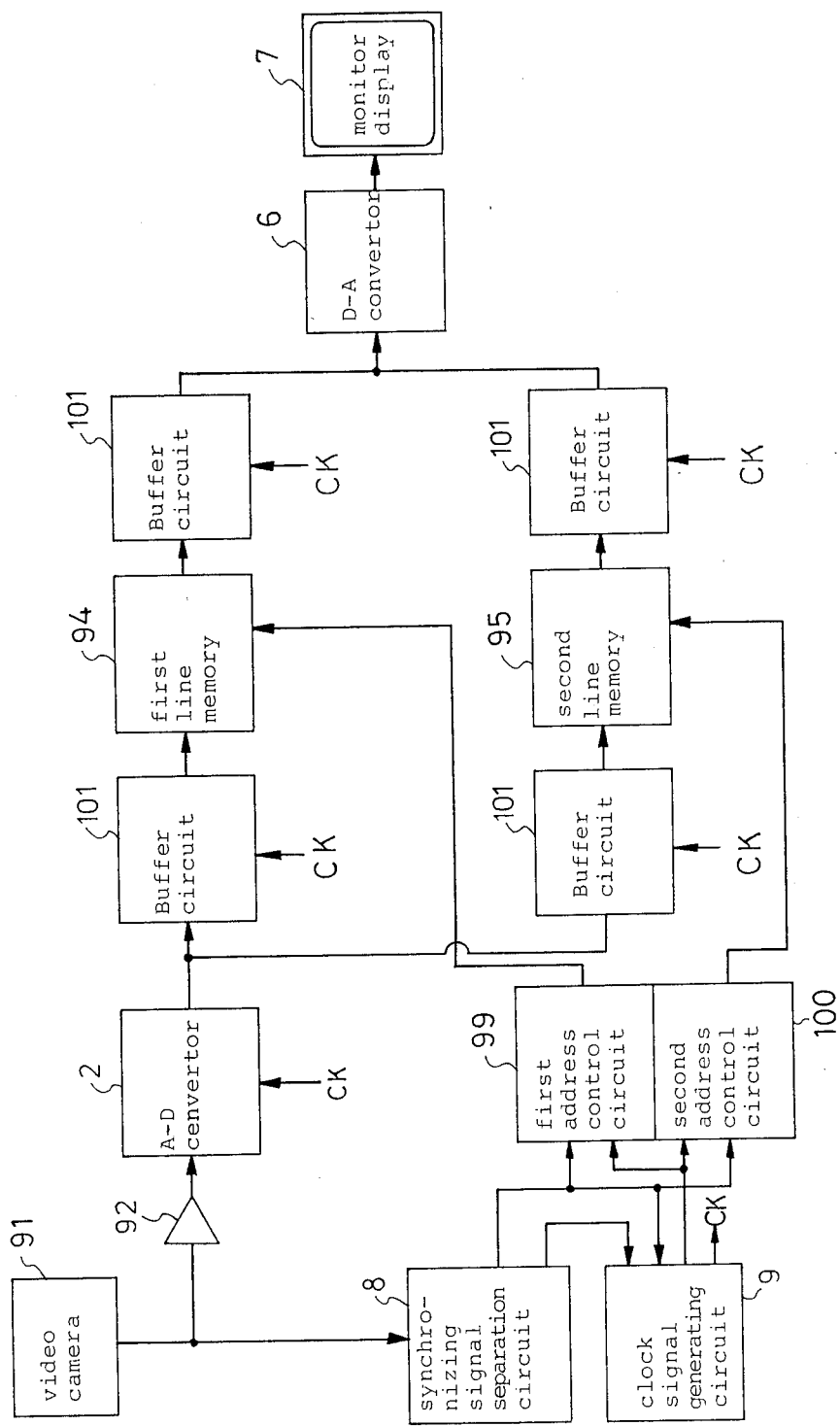
FIG. 9 is a circuit diagram of a fourth embodiment of the video monitoring apparatus in the present invention.

An embodiment using a solid state pick-up device is shown in FIG. 8, FIG. 9 and FIG. 10. In an actual application of a video system for a monitoring apparatus, a backward scene picked up by the video camera which is disposed on the back of the vehicle is displayed in the video display on the dashboard as a reversed image in horizontal direction. For example, an object which is leftward of the rear of the vehicle is displayed on the right part of the video display for the driver. In some case, the above-mentioned reversing of the direction is an inconvenience. In a video camera using a vidicon, reversing of the image can be accomplished easily by reverse connection of the deflection. Nevertheless, the video camera using the vidicon is not preferable to the vehicle with severe vibration. On the other hand, the video camera using the solid state pick-up device, for example, a charge coupled device, is very risistant to vibration and is preferable for the vehicle, and furthermore the reversing of the image is realized by a video signal processing. In FIG. 8, FIG. 9 and FIG. 10 the reversing of the image by the video signal processing is shown.

The scanning line of the video signal from the solid state pick-up device 91 of FIG. 9 is shown in FIG. 8(a). A scanning period 1H is about 63.5 micro-seconds in Japanese Standard, and one field is formed by about 525/2 scanning lines. These signals are memorized by the line memories 94, 95 each having scanning period of 1H as shown in FIG. 9. In FIG. 8(a), each vertically aligned bar shows a signal of a picture element, and height of the bar shows intensity of the signal for a picture element. For example, the signal memorized in the line memory 94 as shown in FIG. 8(b) is read out in reverse order during the second scanning period 2H and the reversed scanning signal of the first scanning signal is issued with a delay of the first scanning period 1H, as shown in FIG. 8(c). The second scanning signal is similarly memorized during the second scanning period 2H by the line memory 95 as shown in FIG. 8(d), and is read out in reverse order during the third scanning period 3H, and the reversed scanning signal of the second scanning signal is issued with delay of the second scanning period 2H as shown in FIG. 8(e). The reversed signals are applied to the video display 102 through a buffer circuit 101 and a D-A convertor 96, and the reversed display in the horizontal direction is realized.

The circuit diagram for the above-mentioned video signal processing is shown in FIG. 9. A video camera 91 using a solid state pick up device is connected to a preamplifier 92 with a band pass characteristic and a synchronizing signal separation circuit 8. The A-D converter 2 converts the analog signal to the 8 bit digital signal.

A first line memory circuit 94 memorizes odd numbered scanning lines, and a second line memory circuit 95 memorizes even numbered scanning lines, of each frame. D-A convertor 6 converts the digital signal from the first and second memory circuits 94, 95 to the analog signal. The synchronizing signal separation circuit 8 separates the synchronizing signal from the video signal of the video camera 91, and a second address control circuit 100 controls the second line memory circuit 95 for memorizing the data from the A-D convertor 2 issues synchronizing pulse.

A clock signal generating circuit 9 issues clock pulses for controlling the first and second line memory circuits 94, 95. A first address control circuit 99 controls the first line memory circuit 94 for memorizing the data from the A-D convertor 2 and for reading out the memorized data in reverse order. A buffer circuit 101 adjust the timing of the transmission of each digital data. The A-D convertor 2, the D-A convertor 6, the synchronizing signal separation circuit 8, the clock signal generating circuit 9 and the monitor display 7 are the same circuits as described with reference to FIG. 1.

The video signal from the video camera 91 which is applied to the preamplifier 92 is clamped and is amplified to the predetermined level through a low pass filter (not shown). The amplified video signal is converted to the 8 bit digital signal by the A-D convertor 2. The data in the first scanning period 1H as shown in FIG. 8(a) of the digital signal is memorized by the first line memory circuit 94 through the buffer circuit 101. Each signal of the picture elements in a scanning period synchronizes with the clock signal CK which is provided by the clock signal generating circuit 9 and is memorized by the first line memory circuit 94. The memory of the first scanning period is controlled by a write-enable signal (not shown in drawing) and the 8 bit signal of the first address control circuit 99.

When the first scanning period finishes, the digital data corresponding to the analog signal as shown in FIG. 8(b) is memorized by the first line memory circuit 94. When the second scanning period starts the readout of the data of the first line memory circuit 94 starts in reverse order, and the readout data are applied to the D-A convertor 6 through the buffer circuit 101, and are converted to the analog video signal. The video signal is applied to the video display 7 in the second scanning period 2H as shown in FIG. (c). In the next place, the video signal, which is picked up by the video camera 91 during the second scanning period, is applied to the second line memory circuit 95 through the preamplifier 92, the A-D convertor 2 and the buffer circuit 101, and it is memorized as shown in FIG. 8(d). When the third scanning period started, the readout of the data of the second line memory circuit 95 is started in reverse order as shown in FIG. 8(c). The memory and the readout of the second line memory 95 is controlled by the write enable signal and the 8 bit signal from the second address control circuit 100.

The above-mentioned operation is repeated by turns, and the readout data is converted to the analog signal by the D-A convertor 6 and is displayed by the video display 7.

The vertical synchronizing signal VD and the horizontal synchronizing signal HD are applied to the clock signal generating circuit 9, the first address control circuit 99 and the second address control circuit 100, and control the issuing timing of the signal. Thereby, the data for memorizing in one scanning period is decided.

An output signal SYNC of the synchronizing signal separation circuit 8 is used in case that the read out data from the line memory circuits must be controlled by the synchronizing signal.

The reversing of the image by the video signal processing in a color video system is shown in FIG. 10. A color composite signal which is picked up by a color video camera 90 is converted to the digital signal by an A-D convertor 93. A memory circuit 103 memories the output signal of the A-D convertor 93, and when the memorized signal is readout, the direction of the scanning line is reversed. Thereby, the horizontal direction of the video image is reversed. A D-A convertor 96 converts the output signal from the memory circuit 103, and issues an analog signal to an adder 107. A synchronizing signal separation circuit 97 separates the synchronizing signal from the color composite signal. A clock signal generating circuit 98 generates the clock signal is synchronizm with the synchronizing pulses from the synchronizing signal separation circuit 97. The clock signal is also applied to the A-D convertor 93 and the D-A convertor 96. A counter of an address control circuit 110 is driven by the vertical synchronizing signal VD and the horizontal synchronizing signal HD of the synchronizing signal separation circuit 97. Additionally, the order of the memory and the order of the read out of the scanning line are controlled. A burst gate circuit 104 synchronizes the vertical synchronizing signal VD and the horizontal synchronizing signal HD and separates the color burst signal from the color composite signal. A phase circuit 105 reverses the phase of the color burst signal of the burst gate circuit 104 to the phase of 180°. A reversed burst generating circuit 106 adjusts the level of the phase reversed color burst signal to the predetermined value. An adder 107 adds the phase reversed color burst signal of the reversed burst generation circuit 106 to the output signal of the D-A convertor 96, and generates the color composite signal which the horizontal direction is reversed. A color monitor display 102 displays the output color video signal of the adder 107.

The operations of this embodiment are as follows.

The color composite signal including the luminance signal and the modulated chrominance signal in the NTSC system is an analog signal. This color composite signal is directly applied to the A-D convertor 93, and is converted to the 8 bit digital signal by the clock signal with the frequency of 3.58 MHZ×4 of the clock signal generating circuit 98. This digital video signal is controlled by the address control circuit 110, and is memorized by the memory circuit 103. The memory circuit 103 consisted of, for example, the memory for one field, the memorized data of the field is read out in reverse order to the memorized order from the memory circuit 103 by the the control of the address control circuit 110. As a result, disposition of the left part and the right part in the video display is reversed. Reversed video signal is issued with a delay of one field in the above-mentioned case. On the other hand, the memory circuit 103 can be consisted of a line memory for memorizing one scanning line. In this case, the memorized data of the scanning line is read out in a reversed order to the memorized order from the memory circuit 103, with a delay of one scanning line.

The output signal of the memory circuit 103 is converted to the analog signal by the D-A convertor 96, and applied to the adder 107. On the ohter hand, the color burst signal of the color composite signal (burst sine wave with the frequency of 3.58 MHz) is separated, and its phase is reversed by the phase circuit 105. The color burst signal with reversed phase is adjusted to the predetermined level by the reversed burst generating circuit 106, and is applied to the adder 107. As a result, the output signal with the color burst signal of reversed phase is added to the output signal of the D-A convertor 96 is issued. This output signal is the overlapped signal of the luminance signal and the reversed chrominance signal which is modulated with the frequency of 3.58 MHz. This color video signal is applied to the color monitor display 102 and is separated to the three primary chrominance signal. In the color monitor display 102, since the phase of the reference subcarrier signal for detecting is shifted 180° from the color burst signal of the color composite signal. Accurate three primary colors signal is realized.

As mentioned abaove, the color video image wherein the left and the right direction is reversed in the NTSC system using the solid state image device is displayed on the color monitor display 102.

What is claimed is:

1. A video monitoring apparatus comprising:
   a video camera for observing a scene and providing an analog signal thereof;
   an analog-digital convertor for converting an analog signal from said camera consisting of n scanning lines to a digital signal,
   abridge and memory means for memorizing an abridged part of said digital signal abridged from said digital signal corresponding to said n scanning lines,
   picture range conversion means for converting a picture range by reading out memorized data from said memory means, to reconstitute a picture signal consisting of n scanning lines, and
   display means for displaying video pictures produced by said picture range conversion means.

2. A video monitoring apparatus in accordance with claim 1, wherein
   said abridge and memory means abridges one-half of said n scanning lines of n scanning lines of a video picture with an aspect ratio of $M_1$ to $M_2$ and memorizes said abridged one-half of said n scanning lines, and
   said picture range conversion means reads out said memorized data and inserts scanning lines corresponding to said memorized data alternately between original scanning lines, and reconstitutes a picture consisting of n scanning lines and having an aspect ratio of $M_1$ to $2 \times M_2$.

3. A video monitoring apparatus comprising two video cameras, a first analog-digital convertor for converting an analog video signal from a first of said video cameras to a first digital signal, a second analog-digital convertor for converting an analog video signal from a second of said video cameras to a second digital signal, first switch means for switching said first digital signal as a function of an odd numbered $(2n-1)$ scanning line or an even numbered $(2n)$ scanning line, second switch means for switching said second digital signal as a function of an odd numbered $2n-1$) scanning line or an even numbered $2n$) scanning line, a first line memory for memorizing said first digital signal provided through said first switch means during said scanning of an odd numbered scanning line, a second line memory for memorizing said first digital signal provided through said first switch means during said scanning of an even numbered scanning line, a third line memory for memorizing said second digital signal provided through said second switch means during said scanning of an odd numbered scanning line, a fourth line memory for memorizing said second digital signal provided through said second switch means during said scanning of an even numbered scanning line, a first adder for adding and issuing digital signal read out from said third line memory after read out of digital signal of said first line memory during said scanning of an even scanning line, a second adder adding and issuing digital signal read out from said fourth line memory after read out of digital signal of said second line memory during scanning of an odd numbered scanning line, a third adder adding and issuing digital signal of said second adder after issue of output digital signal of said first adder, and a display means for displaying video pictures from the output of said third adder.

4. A video monitoring apparatus in accordance with claim 1, wherein said memory means comprises two field memory circuits, and said picture range conversion means comprises readout means for reading out twice said digital signal corresponding to each scanning line memorized in said field memory circuits in synchronism with an horizontal synchronizing signal, a line memory circuit for memorizing a readout digital signal from said field memory circuits, an average operational circuit for calculating an average value of readout data from said field memory circuits and readout data from said line memory circuit, and a gate circuit for selectively issuing data from said average operational circuit or said digital signal corresponding to secondly readout signal of respective scanning lines from said field memory circuits.

5. A video monitoring apparatus in accordance with claim 3, wherein said two video cameras are disposed one on a left side and one on a right side of a vehicle, said apparatus further comprising a sign, which turns on and off or is continuous, for display on the video monitor display by operation of a turn signal or a device corresponding to the turn signal of said vehicle.

6. A video monitoring apparatus comprising, a video camera for issuing a video signal by scanning lines corresponding to a two dimensional picture, an analog to digital convertor for converting said video signal from said video camera to a digital signal, a first line memory for memorizing the digital signal corresponding to picture elements of odd numbered scanning lines from a start of a field, a second line memory for memorizing the digital signal corresonding to picture elements of even numbered scanning lines from a start of the field, readout means for reading out data of said first line memory in reverse order to said memorizing during a memorizing period of said even numbered scanning lines, readout means for reading out data of said second line memory in reverse order during a memorizing period of said odd numbered scanning line, and a display means for displaying a video picture from the outputs of said first line memory and said second line memory controlled by said readout means.

7. A video monitoring apparatus in accordance with claim 6, wherein said two dimensional picture is constituted by a color composite signal including a luminance signal and a chrominance signal, the phase of a color burst signal at an input terminal of said analog-digital convertor being converted to a reverse phase, and said color burst signal with reversed phase being added to an output signal of a digital to analog convertor for presentation to said display means.

* * * * *